United States Patent [19]
Ando et al.

[11] Patent Number: 4,557,850
[45] Date of Patent: Dec. 10, 1985

[54] COMPOSITION FOR ABSORPTION REFRIGERATION

[75] Inventors: Eiji Ando, Katano; Yoshiki Goto, Nara; Kumiko Moriyama, Hirakata; Isao Takeshita, Neyagawa; Kunio Hirao, Kadoma, all of Japan

[73] Assignee: Matsushita Electric Industrial Company, Limited, Osaka, Japan

[21] Appl. No.: 367,034

[22] Filed: Apr. 7, 1982

[30] Foreign Application Priority Data

Apr. 7, 1981 [JP] Japan ................................. 56-52716
Apr. 7, 1981 [JP] Japan ................................. 56-52717

[51] Int. Cl.$^4$ ................................................ C09K 5/04
[52] U.S. Cl. ........................................ 252/68; 252/67; 252/69; 252/78.5
[58] Field of Search ..................... 252/67, 68, 69, 78.5

[56] References Cited

U.S. PATENT DOCUMENTS

| 2,040,912 | 5/1936 | Zellhoefer | 252/69 |
| 2,149,947 | 3/1939 | Zellhoefer | 252/69 |
| 4,072,027 | 2/1978 | Berenbaum et al. | 252/68 |
| 4,454,052 | 6/1984 | Shoji et al. | 252/67 |

FOREIGN PATENT DOCUMENTS 927762 6/1963 United Kingdom .

Primary Examiner—Lorenzo B. Hayes
Assistant Examiner—Robert A. Wax
Attorney, Agent, or Firm—Lowe, King, Price & Becker

[57] ABSTRACT

A composition for absorption refrigeration which comprises a fluorinated hydrocarbon refrigerant, an amide or glycol ether solvent serving as an absorption liquid, and a phosphite stabilizer. The stabilizer is used in an amount of 0.05 to 0.5 wt % of the absorption liquid calculated as phosphorus, within which range the phosphite stabilizer can suitably protect the refrigerant and the absorption liquid from deteriorating and decomposing at high operation temperatures.

17 Claims, No Drawings

COMPOSITION FOR ABSORPTION REFRIGERATION

BACKGROUND OF THE INVENTION

1. Field of the invention

This invention relates to an improved composition for use in absorption refrigeration systems or heat pumps.

2. Description of the Prior Art

In general, the absorption refrigeration system is a closed circuit containing a refrigerant-absorption liquid composition or solution therein. The refrigeration is effected by evaporating the liquefied refrigerant in an evaporator of the circuit. The refrigerant vaporized in the evaporator is then brought into contact with and absorbed in a weak solution or a solution with a low concentration of the refrigerant in an absorber. The resulting strong solution, i.e. a solution having a high concentration of the refrigerant, is applied with heat from an external heat source to release the refrigerant vapor. The vaporized refrigerant is then condensed in a condenser whereupon heat generates, and again fed into the evaporator as the liquefied refrigerant. On the other hand, the solution from which the refrigerant vapor has been released is fed back into the absorber as the weak solution, in which the refrigerant vapor is again absorbed.

The highest possible effect of this cooling and heating mode of operation can be attained only when the strong solution is held at high temperatures in the generator.

In order to realize the maximum effect, there has been proposed a refrigerant-absorption liquid composition which comprises monochlorodifluoromethane (R-22) as a refrigerant and N, N-dimethylformamide (DMF) as an absorbent. However, either absorption refrigeration machines or heat pumps using this composition have never been put into practice yet. One of reasons for this is considered due to the fact that when the above composition is heated to high temperatures over about 120° C., R22 decomposes into products such as hydrochloric acid and hydrofluoric acid with the attendant decomposition of DMF, so that not only the apparatus is damaged by corrosion, but also there arises the vital problem that R22 and DMF deteriorate in their physical and chemical properties.

Another type of absorption liquid-refrigerant composition, which comprises tetraethylene glycol dimethyl ether (TEGDME) as an absorbent, has also been proposed as being more chemically stable than the above-described composition. Although this composition has improved heat stability over the first-mentioned composition only by 20°-40° C., its life is insufficient for practical applications. For instance, when a composition composed of R-22 and TEGDME is heated to over 150° C., these two components considerably deteriorate in physical and chemical properties similar to the R-22/DMF composition.

It is well known in the art that R-22 is relatively stable among various fluorinated hydrocarbons, DMF yields decomposition products such as an amine when coexisting with metals, and TEGDME is one of the most stable materials as an organic solvent. Nevertheless, when applied, in combination, as a composition for absorption refrigeration, these compounds undergo much more rapid and complicated deterioration and decomposition reactions than expected from the thermal stabilities of the individual compounds. These deterioration and decomposition reactions take place in very different and complicated manners according to the constituent components and combinations thereof, and hence it is very difficult to thermally stabilize those compositions at high temperatures. This is why the refrigerant-absorption liquid compositions using combinations of R22 and DMF and R22 and TEGDME have not been reduced into practice yet in spite of their better physical and chemical properties than those of other known compositions.

SUMMARY OF THE INVENTION

It is an object of the invention to provide a composition for absorption refrigeration which has much improved thermal stability over the prior-art compositions and can suitably be applied to absorption refrigeration systems or heat pumps.

It is another object of the invention to provide a refrigerant-absorption liquid composition which is hard to deteriorate or decompose over a long time when subjected to an ordinary absorption refrigeration operation.

It is a further object of the invention to provide a refrigerant-absorption liquid composition which comprises phosphites as a stabilizer whereby the life of the composition is prolonged to a considerable extent.

The above objects can be achieved, according to the invention, by a refrigerant-absorption liquid composition which comprises a fluorinated hydrocarbon serving as a refrigerant, an amide or glycol ether compound serving as an absorption liquid or absorbent, and a phosphite compound which is a stabilizer for these refrigerant and absorption liquid and is contained in an amount of 0.05 to 0.5 wt % of the amide or glycol ether compound calculated as phosphorus.

That is, the present invention is characterized by the use of phosphite compounds as a stabilizer and also by the combination of phosphite compounds with fluorinated hydrocarbons and amides or glycol ethers. The phosphite compounds used in the present invention are very effective, as a stabilizer, against the specific combinations of fluorinated hydrocarbons and amides or glycol ethers but are inert to compositions using absorbents other than amides or glycol ethers.

DETAILED DESCRIPTION AND PREFERRED EMBODIMENTS OF THE INVENTION

The fluorinated hydrocarbons useful in the present invention are mainly fluorinated methanes and ethanes but are not limited to these compounds and may include hydrocarbons which have at least one hydrogen, at least one fluorine and the remaining chlorine attached to the carbon atoms. Typical of the fluorinated hydrocarbons are monochlorodifluoromethane (hereinafter abbreviated as R-22), dichloromonofluoromethane ( hereinafter abbreviated as R-21), trifluoromethane (hereinafter abbreviated as R-23), monochlorotetrafluoroethane or an isomer thereof (hereinafter abbreviated as R-124 or R-124a), dichlorotrifluoroethane or an isomer thereof (hereinafter abbreviated as R-123 or R-123a), monochlorotrifluoroethane or an isomer thereof (abbreviated as R-133, R-133a or R-133b), monochlorodifluoroethane or an isomer thereof (abbreviated as R-142 or 142b), difluoroethane or an isomer thereof (abbreviated as R-152 or R-152a), and mixtures thereof. As mentioned, isomers of these fluorinated hydrocarbons may be likewise used. These fluorinated hydrocarbons are properly used mainly according to the operation conditions of the absorption cycle. Preferably, R-21, R-22, R-23, R-124, R-124a, R-123, R-133, R-133a, R-142b, and R-152a are used, and most preferably, R-22, R-124 and R-124a are used. These fluorinated hydrocarbons are considered to show very strong hydrogen bonding between one hydrogen atom in the molecule thereof and an absorbent. This hydrogen bonding contributes to increase the absorbing and dissolving power of the refrigerant.

As mentioned hereinbefore, the absorbent is an amide compound or a glycol ether compound. The amide compounds used in the present invention should be compounds having at least one CON bond in the molecule thereof and include, for example, formamide, acetoamide, monomethylformamide, monomethylacetoamide, tetramethylurea, N-methylpyrrolidone, N, N-dimethylformamide (hereinafter abbreviated as DMF), N, N-dimethylacetoamide (hereinafter abbreviated as DMA), N, N-dimethylpropionamide (hereinafter abbreviated as DMP), N, N-diethylformamide (hereinafter referred to as DEF) and mixtures thereof. Of these, DMF, DMA, DMP, DEF and a mixture thereof are preferably used and most preferably, DMF and DMA can be mentioned. These amide compounds are likely to form the hydrogen bond with the refrigerant compound and exhibit a great absorbing and dissolving power of the refrigerant.

Alternatively, glycol ether compounds can also be used as an absorbent in the practice of the invention. Useful glycol ether compounds are those expressed by the general formula, $R_1—(OC_2H_4)_n—OR_2$, in which $R_1$ and $R_2$ are independently hydrogen, an alkyl group, an alkenyl group, a phenyl group, an alkylphenyl group, an alkylenephenyl group, an alkylenealkylphenyl group and the like except the case where both the $R_1$ and $R_2$ represent hydrogen at the same time, and n is an integer of 1-4. The glycol ether forms the hydrogen bond with a fluorinated hydrocarbon and contributes to increase the absorbing and dissolving power of the hydrocarbon. The $R_1$ and $R_2$ are not critical with respect to the size, the kind and the combination of groups. However, the glycol ether of the above-indicated formula where both the $R_1$ and $R_2$ are hydrogen is not included within the scope of the invention because its power of dissolving fluorinated hydrocarbons is poor. However, the glycol ethers of the formula where either $R_1$ or $R_2$ is hydrogen and the other is a group other than hydrogen are within the scope of the invention and such ethers include, for example, diethylene glycol monomethyl ether and tetraethylene glycol monobutyl ether. Preferably, both the $R_1$ and $R_2$ are an alkyl group such as methyl, ethyl, butyl or the like lower alkyl and specific examples of such compounds include ethylene glycol dimethyl ether, ethylene glycol diethyl ether, ethylene glycol dibutyl ether (hereinafter abbreviated as EGDBE,) diethylene glycol dimethyl ether (hereinafter abbreviated as DEGDME), diethylene glycol diethyl ether (hereinafter abbreviated as DEGDEE), diethylene glycol dibutyl ether (hereinafter abbreviated as DEGDBE), triethylene glycol dimethyl ether (hereinafter abbreviated as T$_3$EGDME), triethylene glycol diethyl ether, triethylene glycol dibutyl ether, tetraethylene glycol dimethyl ether (TEGDME), tetraethylene glycol diethyl ether, and tetraethylene glycol dibutyl ether (hereinafter abbreviated as TEGDBE). Among them, EGDBE, DEGDME, DEGDEE, DEGDBE, T$_3$EGDME, TEGDME and TEGDBE are commercially sold and have preferable physical and chemical properties as an absorbent. Most preferably from the viewpoint of physical and chemical properties, DEGDME, T$_3$EGDME, TEGDME and a mixture thereof are used. As a matter of course, these glycol ethers may be used singly or in combination.

The phosphite compounds which serve as a stabilizer for the fluorinated hydrocarbons and the amide or glycol ether compounds are those represented by the general formula

$P(OR_3)(OR_4)(OR_5)$ in which $R_3$, $R_4$ and $R_5$ are independently hydrogen, an alkyl group, an alkenyl group, a phenyl group, an alkylphenyl group, an alkylenephenyl group and an alkylenealkylphenyl group. Since the phosphite is considered to be an active site with respect to the stabilization, the groups $R_1$, $R_2$ and $R_3$ are not critical in respect of the size and the kind. That is, any combinations of $R_3$, $R_4$ and $R_5$ may be used including combinations of $R_3$, $R_4$ and $R_5$ all of which are the same, combinations where two of the three Rs are the same and the other is different unless the phosphites derived from such combinations present no problem in practical applications with respect to boiling point, melting point and solubility in amide or glycol ether compounds and toxicity. It should be noted that at least one of $R_3$, $R_4$ and $R_5$ has to be a group other than hydrogen, i.e. the three should not be hydrogen at the same time. As is particularly shown in examples, preferable phosphites are: alkyl phosphites which have at least two alkyl substituents having 1-18 carbon atoms and the remaining hydrogen atom, including dimethyl phosphite, trimethyl phosphite, diethyl phosphite, triethyl phosphite, diisopropyl phosphite, triisopropyl phosphite, di-n-butyl phosphite, tri-n-butyl phosphite, tri-(2-ethylhexyl) phosphite, diisooctyl phosphite, triisooctyl phosphite, triisodecyl phosphite, tridecyl phosphite, didodecyl phosphite, dilauryl phosphite, trilauryl phosphite, tris(tridecyl) phosphite, dioleyl phosphite, trioleyl phosphite, dioctadecyl phosphite and trioctadecyl phosphite; aryl phosphites having at least two phenyl groups or alkylphenyl groups whose alkyl group has 1-9 carbon atoms and including triphenyl phosphite, diphenyl phosphite, tris-nonylphenyl phosphite, diphenylnonylphenyl phosphite, tricresyl phosphite and tris-nonylphenyl phosphite; and arylalkyl phosphites having at least one alkyl group, at least one phenyl or alkylphenyl group and the remaining hydrogen and including, for example, diphenylmonodecyl phosphite, diphenylmono(tridecyl)phosphite, phenyldiisodecyl phosphite, diphenylisodecyl phosphite, diphenylisooctyl phosphite, phenyldiisooctyl phosphite and the like. Among them, most preferable phosphites are alkyl phosphites which hardly undergo thermal decomposition and have a wider range in tolerance limit of the phosphorus concentration. More specifically, alkyl phosphites whose alkyl moiety has 3-13 carbon atoms are most preferable since triethyl phosphite or trimethyl phosphite whose alkyl group has not more than two carbon atoms is hard to handle owing to their susceptibility to oxidation, or alkyl phosphites such as dioctadecyl phosphite whose alkyl group has not less than 14 carbon atoms have melting points higher than a normal temperature. These phosphites can be used singly or in combination.

The amounts of the fluorinated hydrocarbon and the amide or glycol ether compound are not critical and are determined mainly on the basis of operating conditions of the machine as is well known in the art. In general, the ratio by weight of the fluorinated hydrocarbon refrigerant to the amide or glycol ether absorbent is in the range of 1:20 to 5:1.

The amount of the phosphite compound should be determined within a range not to impede the thermodynamic, physical and chemical properties of the composition. The concentration of phosphorus higher than 1 wt % based on the composition adversely affects the composition, so that not only an appreciable stabilizing effect in correspondence to the amount cannot be expected, but also the cost of the composition increases. Although the phosphorus concentration ranging from 0.5 to 1 wt % may be used, there appears a substantial difference in effect depending on the molecular weight and the structure of the phosphite compound used: some aryl phosphites and arylalkyl phosphites bring about ill effects on the composition. Accordingly, the phosphite compound is generally used in an amount of 0.05 to 0.5 wt %, as phosphorus, on the basis of the absorbent, within which the satisfactory stabilizing effect can be achieved. Preferably, the concentration of phosphorus is in the range of 0.05 to 0.2 wt %.

These phosphite compounds show a remarkable stabilizing effect when used in combination with the amide or glycol ether compound selected as an absorbent and the fluorinated hydrocarbon as a refrigerant but are not effective against absorption refrigerant compositions using organic compounds or solvents other than the amide or glycol ether compounds. For instance, other organic solvents such as nonanal, N-methylpyrrole, butyl propionate, anisole, cyclohexanone, ethyl acetate, 2, 4-dimethyl-1, 3-dioxolan, piperidine, and 2,5-hexadione are known as an absorbent but no effect is produced on these compounds as will be seen in examples. Because the phosphite compounds show the stabilizing effect on DMF, DMA, DEGDME, TEGDME and the like, it seems that the stabilizing effect has some relation with the —CON— bond in the molecule of amide compounds or the —$(OC_2H_4)_n$—O— bond of glycol ether compounds.

The absorbent-refrigerant composition according to the invention exhibits much more thermal stability than known compositions: even at temperatures as high as over 200° C., the constituents of the composition, i.e. fluorinated hydrocarbons and amides or glycol ethers, are prevented from deteriorating or decomposing, and the yellowing of the composition takes place only very slowly and slightly without involving formation of any tar-like black solids. The addition of the phosphite compound extends the life of the composition about 10 times as long for the amide absorbent and about 20 times for the glycol ether absorbent. When applied to absorption refrigeration machines, the composition will show a life over about 10-20 years.

The present invention is particularly described by way of examples.

EXAMPLE 1

R-22 and DMA were mixed at a ratio of 1:1 on the weight basis, to which was added each of compounds indicated in Table 1 below in an amount of 0.5 wt % of DMA. Each composition was charged into a Pyrex glass tube in coexistence with aluminum, copper, and stainless steel (SUS-304) and subjected to the thermal stability test at 160° C.

TABLE 1

| Sample No. | Compounds | |
|---|---|---|
| 1 | triethyl phosphite | Compound of invention |
| 2 | 2,4,6-(trimethylaminomethyl)-phenol | Comparative Compounds |
| 3 | dilauryl thiopropionate | |
| 4 | 1,3,4-thiadiazolyl-2,5-bisdiethyldithiocarbamate | |
| 5 | butoxyethylamidophosphate diethylamine | |
| 6 | di-cyclohexylamine nitrite | |
| 7 | nil | |

The sample 1 made use of a phosphite compound of the present invention and the others were for comparison. For reference, a composition composed of R-22 and DMA alone was similarly tested as 7. It will be noted that the samples 1 through 3 are directed to well-known compounds as an antioxidant and the samples 4 through 6 are directed to compounds known as a rust inhibitor.

As a result, it was found that the sample 7 containing no additive turned black in color and solidified at the 2nd day after commencement of the test and the samples 2 through 7 also turned black and solidified at the 2nd-3rd days. On the other hand, the sample 1 did not turn black in color before the 7th day. The aluminium in the samples 2 through 7 considerably corroded and was covered with a tar-like substance, and the copper and stainless steel became black on the entirety thereof. With the sample 1, the aluminium corroded only slightly with the copper and stainless steel becoming slightly dark on the surface thereof.

From the above, it will be appreciated that the known antioxidants and rust inhibitors do not produce any satisfactory stabilizing effect on the composition but triethyl phosphite exhibits the remarkable stabilizing effect.

EXAMPLE 2

R-124 and DMF were mixed at a ratio of 1:1 on the weight basis, to which was added each of compounds indicated in Table 2 below in an amount of 1.5 wt % of DMF. Each composition was charged into a Pyrex glass tube and subjected to the heat stability test at 200° C. in coexistence with copper and stainless steel.

TABLE 2

| Sample No. | Compounds | |
|---|---|---|
| 8 | tridecyl phosphite | Compounds of Invention |
| 9 | diphenylmono(tridecyl) phosphite | |
| 10 | triphenyl phosphite | |
| 11 | 2,6-di-t-butyl-p-cresol | Comparative Compounds |
| 12 | phenyl-alpha-naphthylamine | |
| 13 | 2,2,4-trimethyl-1,2-dihydroquinone | |
| 14 | beta-naphthol | |
| 15 | 1,2,4-trihydroxybenzene | |
| 16 | hexamethyltetramine | |
| 17 | 2,4-dinitrotoluene | |
| 18 | methaphenilenediamine | |
| 19 | m-nitroaniline | |
| 20 | nil | |

The compounds of the samples 8 through 13 are known as an antioxidant, the compounds of the samples 14 through 16 are known as a stabilizer for DMF, and the compounds of the samples 17 through 19 are known as a dehalogenation inhibitor. The sample 20 is a composition composed of R-124 and DMF alone.

As a result of the test, the sample 20 assumed a yellow color immediately after the test and then turned black and, at the 4th day, the Pyrex glass tube was broken by explosion. The samples 14 through 19 turned black at a rate equal to or more rapid than the sample 20. The samples 11 through 13 became black at the 7th day but the samples 8 through 10 of the invention was slow in discoloration speed and merely assumed a yellow color at the 7th day.

The stabilizers and dehalogenation inhibitors for DMF gave rather an adverse effect than no effect. This is considered due to the fact that the mixture of DMF and R-124 undergoes deterioration and decomposition reactions different from the reactions involved with the case of the individual compounds.

Among the antioxidants, the alkyl phosphite, the aryl phosphite and the arylalkyl phosphite used in the present invention show the remarkable stabilizing effect similar to Example 1.

EXAMPLE 3

R-124 and TEGDME were mixed at a ratio of 1:1 on the weight basis, to which was added each of the compounds indicated in Table 3 below in an amount of 0.8 wt % of TEGDME. Each composition was charged into a Pyrex glass tube and subjected to the thermal stability test at 220° C. in coexistence with aluminum, copper and stainless steel.

TABLE 3

| Sample No. | Compounds | |
|---|---|---|
| 21 | tri-n-butyl phosphite | Compound of Invention |
| 22 | 2,2'-methylenebis-(4-ethyl-6-t-butylphenol) | Comparative Compounds |
| 23 | 1,1'-thiobis-(2-naphthol) | |
| 24 | di-myristyl thiopropionate | |
| 25 | 2-(n-dodecylthio)-benzothiazole | |
| 26 | di-n-butyl disulfide | |
| 27 | glycidyl phenyl ether | |
| 28 | nil | |

The compounds of the samples 21 through 24 are known as an antioxidant and the compounds of the samples 25 through 27 are known as a rust inhibitor.

The sample 28 turned black and solidified at the 5th day and the samples 22 through 27 became black and solidified at the 5th and 6th days. As regards the sample 21, it took 20 days before the composition had turned black. The aluminium in the samples 22 through 27 suffered considerable corrosion and was covered with a tar-like substance, and the copper and stainless steel entirely assumed a black color. On the other hand, with the sample 21, the aluminium suffered a slight degree of corrosion, and the copper and stainless steel turned dark only slightly.

Accordingly, in the composition using the glycol ether as an absorbent, the ordinary antioxidants and rust inhibitors showed little or no stabilizing effect similar to the cases using the amide compounds described in Examples 1 and 2. However, tri-n-butyl phosphite of the invention exhibited the remarkable stabilizing effect.

EXAMPLE 4

R-22 and T3EGDME were mixed at a ratio of 1:1 on the weight basis, to which was added each of the compounds indicated in Table 4 below in an amount of 1.5 wt % of T3EGDME, followed by charging into a Pyrex glass tube and subjecting to the heat stability test at 200° C. in coexistence with copper and stainless steel.

TABLE 4

| Sample No | Compounds | |
|---|---|---|
| 29 | triisodecyl phophite | Compounds of Invention |
| 30 | diphenylmonodecyl phosphite | |
| 31 | tricresyl phosphite | |
| 32 | pentaerythrityl-tetrakis-[3-(3,5-di-t-butyl-4-hydroxyphenyl)propionate] | Comparative Compounds |
| 33 | distearyl thiodipropionate | |
| 34 | alpha-naphthylamine | |
| 35 | m-dinitrobenzene | |
| 36 | m-toluylenediamine | |
| 37 | nil | |

The compounds of the samples 29 through 34 are known as an antioxidant and the compounds of the samples 35 and 36 are known as a dehalogenation inhibitor.

The reference sample 37 assumed a yellow color at the 30th day after commencement of the test. The samples 32 through 36 turned brown at a rate equal to or higher than the sample 37. On the other hand, the samples 29 through 31 of the invention underwent no change and remained colorless.

From the above, it will be understood that the antioxidants other than the phosphite compounds and the dehalogenation inhibitors gave an ill effect rather than no effect. The alkyl phosphite, the aryl phosphite and the arylalkyl phosphite of the samples 29 through 31 were much more excellent in stabilizing effect.

EXAMPLE 5

R-22 and each of organic solvents indicated in Table 5 below were mixed at a ratio of 1:2, to which was added 1.5 wt % of didodecyl phosphite based on the organic solvent, followed by subjecting to the heat stability test at 180° C. in coexistence with aluminium, copper and stainless steel. Further, the above procedure was repeated using no didodecyl phosphite.

TABLE 5

| Sample No. | Absorbents | |
|---|---|---|
| 38 | DPM | Absorbents of Invention |
| 39 | DEGDME | |
| 40 | nonanal | Comparative Absorbents |
| 41 | N—methylpyrrole | |
| 42 | butyl propionate | |
| 43 | anisole | |
| 44 | cyclohexanone | |
| 45 | ethyl acetoacetate | |
| 46 | 2,4-dimethyl-1,3-dioxolan | |
| 47 | piperidine | |
| 48 | 2,5-hexadione | |

The samples free of any dodecyl phosphite were numbered as 49 through 59 (not shown) corresponding to the phosphite-containing samples 38 through 48, respectively.

As regards the change in color in relation to time, the samples 40 through 48 assumed a yellow color or turned black and solidified in days equal to or shorter than the samples 51 through 59. In addition, the sample 40 or 45 immediately brought about explosion. The gas chromatographic analysis of decomposition products revealed that with the sample 42, low boiling decomposition products were produced in great amounts similar to the corresponding phosphite-free sample 53. It was observed that the sample 44 turned cloudy and resulted in formation of high boiling decomposition products more rapidly than the corresponding phosphate-free sample 55. The sample 48 became black and solidified similar to the corresponding phosphite-free sample 59.

The samples 41, 43, 46 and 47 showed little difference in the course of discoloration and, when subjected to the quantitative analyses of free fluorine and free chlorine after the thermal stability test, showed the contents of the free fluorine and chlorine equal to or slightly higher than the samples 52, 54, 57 and 58, respectively.

In contrast, the sample 38 turned yellow after 7–8 times as long as the days at which the yellowing of the corresponding phosphite-free sample 49 occurred. Likewise, the sample 39 underwent a yellowing change after 15–20 times as long as the days at which the sample 50 assumed a yellow color. In correspondence to these color changes, the blackening and corrosion of the aluminium, stainless steel and copper metals took place in much less degrees with the samples 38 and 39 than with the samples 49 and 50. Thus, the stabilizing effect of the didodecyl phosphite was produced on DMP and DEGDME alone.

The organic solvents or absorbents used in this example are known and actually applied as an absorbent in combination with fluorinated hydrocarbons but the above results reveal that phosphite compounds do not thermally stabilize all the organic sovents.

As described hereinbefore, this is considered due to the fact that the deterioration and decomposition of absorbent-refrigerant compositions proceeds more rapidly and in a more complicated manner than expected from the stabilities of the individual components of the composition and the reactions involved completely differ depending on the components used. Accordingly, it is a matter of course that the effect of addition of a phosphite compound varies depending on the kinds of absorbent and refrigerant and is not produced on all the types of the compositions.

In view of the fact that phosphite compounds can improve the thermal stability of DMP and DEGDME shown in this example, DMF and DMA shown in Examples 1 and 2, and TFGDME and T₃EGDME shown in Examples 3 and 4, it can be said that phosphite compounds effectively act on the compositions which comprise, as an absorbent, amide compounds having the —CON— bond in the molecule thereof or glycol ethers having the —(OC$_2$H$_4$)$_n$—O— bond in the molecule thereof.

EXAMPLE 6

R-124 and DMA were mixed at a ratio of 1:3 on the weight basis, to which was added each of phosphite compounds in different amounts together with copper and stainless steel, followed by the heat stability test at 200° C. for 7 days. The kinds and amounts of the phosphite compounds are indicated in Table 6, together with the results of the test.

TABLE 6

| Sample No. | Phosphite Compounds | Concentration of Phosphorus Based on DMA (wt %) | Decomposition Rate of R124 (Cl %) | Color |
|---|---|---|---|---|
| 60 | triiso- | 0.035 | 30 | black |
| 61 | octyl | 0.105 | below 1 | colorless |
| 62 | phosphite | 0.20 | below 1 | slight yellow |
| 63 |  | 0.30 | below 1 | yellow |
| 64 |  | 0.515 | 1.1 | brown |
| 65 | trilauryl | 0.028 | 40 | black |
| 66 | phosphite | 0.103 | below 1 | colorless |
| 67 |  | 0.160 | below 1 | slight yellow |
| 68 |  | 0.26 | below 1 | light yellow |
| 69 |  | 0.6 | 13 | black |
| 70 | diphenyl- | 0.051 | below 1 | colorless |
| 71 | isodecyl phosphite | 0.09 | below 1 | slight yellow |
| 72 |  | 0.16 | below 1 | light yellow |
| 73 |  | 0.25 | 1.2 | yellow |
| 74 |  | 0.42 | 1.5 | brown |
| 75 |  | 0.6 | 40 | black |
| 76 |  | 0.05 | below 1 | colorless |
| 77 | triphenyl phosphate | 0.11 | below 1 | slight yellow |
| 78 |  | 0.2 | below 1 | colorless |
| 79 |  | 0.3 | 13 | brown |
| 80 |  | 0.52 | 37 | black |
| 81 |  | 0.7 | 44 | black |
| 82 | nil | — | 15 | black |

The test results demonstrated that the reference sample 82 to which no phosphite was added turned black and solidified at the 7th day and that approximately 15% of R-124 decomposed as determined by the quantitative analysis of free halogen. At phosphorus concentrations below 0.05 wt % as in the samples 60 and 65, no effect of the addition could be expected with the results being rather worse than those of the sample 82. On the other hand, at phosphorus concentrations ranging 0.05 to 0.2 wt % as in the samples 61, 62, 66, 70–72, and 76–78, the compositions did not color at all or assumed a slight degree of yellow color and had a decomposition rate of R-124 in the range below 1%. Moreover, phosphorus concentrations in the range of 0.2 to 0.5 wt % a in the samples 63, 68, 73, 74 and 79, the compositions assumed as yellow or brown color and the decomposition of R-124, more or less, varied but within several %. When the phosphorus concentrations exceeded 0.5 wt % as in the samples 64 69, 75, 80 and 81, the effect depended on the type of phosphite and, in some cases, there appeared an unfavorable effect.

Taking the influence on the composition and the cost into account, the phosphorus concentration over 1 wt % is not advantageous since any additional stabilizing effect cannot be obtained relative to the amount. Preferably, the phosphite is added in the range of 0.05–0.5 wt % calculated as phosphorus on the basis of the absorbent in order to insure a satisfactory stabilizing effect. Most preferably, the phosphorus concentration is in the range of 0.05–0.2 wt %, within which the remarkable stabilizing effect can be attained without involving any deterioration and decomposition of the composition.

EXAMPLE 7

R-124 and DMA were mixed at a ratio of 1:2 on the weight basis, to which were added each of phosphite compounds, copper and stainless steel. Each composition was subjected to the thermal stability test at different temperatures. The results are shown in Table 7 below.

TABLE 7

| | Phosphite Compound | | | | | | | |
|---|---|---|---|---|---|---|---|---|
| | Tri-n-butyl Phosphite | | Tri-isodecyl Phosphite | | Phenyldiisodecyl Phosphite | | Nil | |
| Temperature (°C.) | Sample No. | Days Before Occurrence of Yellowing | Sample No. | Days Before Occurrence of Yellowing | Sample No. | Days Before Occurrence of Yellowing | Sample No. | Days Before Occurrence of Yellowing |
| 220 | 83 | 4 | 87 | 4 | 91 | 4 | 95 | 0.4 |
| 200 | 84 | 14 | 88 | 15 | 92 | 14 | 96 | 1.5 |
| 180 | 85 | 70 | 89 | 72 | 93 | 70 | 97 | 7 |
| 160 | 86 | over 200 | 90 | over 200 | 94 | over 200 | 98 | 25 |

It is well known to those skilled in the art that the number of days from the commencement of the test till the occurrence of yellowing of composition well coincides with the relative life of composition corresponding to the deterioration of composition. Accordingly, higher values show more improved thermal stability, thus increasing the stability of composition.

Over a wide temperature range, the adequate stabilizing effect can be obtained as clearly seen in Table 7. At temperatures over 200° C., the life of the compositions containing the phosphite compounds increases by about 10 times that of the phosphite-free samples 95 through 98. At temperatures below 200° C., the compositions of the invention are very stable over a long time. This long-term stability will correspond to the life over 10 years if the compositions are applied to absorption refrigeration machines.

EXAMPLE 8

R-124 and DEGDME were mixed at a ratio of 1:3 on the weight basis, to which were added each of phosphite compounds copper and stainless steel, followed by the thermal stability test at 220° C. over 7 days. The kinds and amounts of the phosphite compounds are shown in Table 8, together with the test results.

TABLE 8

| Sample No. | Phosphite Compound | Concentration of Phosphorus (wt %) | Amount of Decomposed Chlorine (mg) | Color |
|---|---|---|---|---|
| 99 | tris(2- | 0.03 | over 1 | black |
| 100 | ethylhexyl) | 0.09 | below 0.1 | colorless |
| 101 | phosphite | 0.15 | below 0.1 | slight yellow |
| 102 | | 0.35 | 0.5 | yellow |
| 103 | | 0.55 | below 1 | yellow |
| 104 | tris(tri- | 0.025 | over 1 | black |
| 105 | decyl) | 0.11 | below 0.1 | colorless |
| 106 | phosphite | 0.15 | below 0.1 | slight yellow |
| 107 | | 0.27 | below 0.5 | yellow |
| 108 | | 0.61 | over 1 | brown |
| 109 | phenyldi- | 0.052 | below 1 | colorless |
| 110 | isodecyl | 0.10 | below 0.1 | colorless |
| 111 | phosphite | 0.15 | 0.1 | colorless |
| 112 | | 0.26 | below 0.05 | yellow |
| 113 | | 0.45 | below 1 | brown |
| 114 | | 0.71 | over 1 | black |
| 115 | diphenyl | 0.04 | over 1 | black |
| 116 | phosphite | 0.08 | below 0.1 | colorless |
| 117 | | 0.14 | below 0.1 | colorless |
| 118 | | 0.42 | below 0.52 | brown |
| 119 | | 0.56 | over 1 | black |
| 120 | | 0.71 | over 1 | black |
| 121 | nil | — | over 1 | black |

The reference sample 121 free of any phosphite turned black at the 7th day with approximately 1 mg of R-124 being decomposed as determined by the quantitative analysis. At phosphorus concentrations below 0.05 wt % as in the samples 99, 104 and 115, no effect of addition was produced and these samples were rather worse than the reference sample 121. On the other hand, at phosphorus concentrations ranging 0.05–0.2 wt % as in the samples 100, 101, 105, 106, 109–111, 116 and 117, the compositions were colorless or in a slight degree of yellow with R-124 being decomposed only in amounts below 0.1 mg. At phosphorus concentrations ranging 0.2–0.5 wt % as in the samples 102, 107, 112, 113 and 118, the compositions were yellow or brown in color and the amount of decomposed R-124, more or less, varied in the range of 0.1–0.5 mg except the sample 113. However, when the phosphorus concentration exceeded 0.5 wt % as in the samples 103, 108, 114, 119 and 120, a great difference appeared among the phosphite compounds and, in some cases, an unfavorable influence was produced.

Similar to Example 6, it was confirmed that a preferable concentration of phosphorus was in the range of 0.05–0.5 wt % of the absorbent and the range of 0.05–0.2 wt % was most preferable.

EXAMPLE 9

R-124 and DAGDME were mixed at a ratio of 1:2 on the weight basis, to which were added phosphite compounds, copper and stainless steel, followed by subjecting to the thermal stability test. The results are shown in Table 9. The thermal stability was evaluated in the same manner as in Example 7.

At temperatures over 200° C., the phosphite-containing compositions had an improved thermal stability by about 20 times the phosphite-free compositions 131 through 133 and were very stable at temperatures lower than 200° C. This long-term stability is considered to show a life over about 20 years when these compositions of the invention are used in absorption refrigeration systems.

TABLE 9

| | Phosphite Compound | | | | | | | |
|---|---|---|---|---|---|---|---|---|
| | Triethyl Phosphite | | Triisoctyl Phosphite | | Diphenylisodecyl Phosphite | | Nil | |
| Temperature (°C.) | Sample No. | Days Before Occurrence of Yellowing | Sample No. | Days Before Occurrence of Yellowing | Sample No. | Days Before Occurrence of Yellowing | Sample No. | Days Before Occurrence of Yellowing |
| 220 | 122 | 35 | 125 | 30 | 128 | 30 | 131 | 1.5 |
| 200 | 123 | 85 | 126 | 84 | 129 | 80 | 132 | 4 |
| 180 | 124 | over 250 | 127 | over 250 | 130 | over 250 | 133 | 14 |

EXAMPLE 10

Samples 134 through 159 of the formulations indicated in Tables 10 and 11 were prepared in the same manner as in Example 1. Further, samples 160 through 185 were also prepared for comparative purposes, which samples corresponded to the samples 134 through 159, respectively, except that no phosphite compounds were contained. It will be noted that the samples 160 through 185 are not tabulated.

TABLE 10

| Sample No. | Flon | Amide Compound | Phosphite Compound | Flon/ Amide (wt %) | Phosphite Amide (wt %) | Metals | Test Temp. (°C.) |
|---|---|---|---|---|---|---|---|
| 134 | R-21 | DMA | dimethyl phosphite | 60 | 2.7 | copper, stainless steel | 120 |
| 135 | R-21 | DMP | diphenyl-monodecyl phosphite | 30 | 2.4 | copper | 160 |
| 136 | R-22 | DEF | diisodecyl phosphite | 60 | 1.2 | copper, stainless steel | 140 |
| 137 | R-22 | DMA | phenyldiiso-octyl phosphite | 30 | 1.3 | stainless steel | 160 |
| 138 | R-22 | DMP | diphenyl phosphite | 15 | 1.2 | copper, stainless steel, aluminium | 180 |
| 139 | R-23 | DMF | tri-(2-ethyl-hexyl)phosphite | 5 | 1.4 | copper, stainless steel | 180 |
| 140 | R-123 | DEF | diethyl phosphite | 60 | 0.8 | copper | 180 |
| 141 | R-124 | DMA | trioleyl phosphite | 30 | 2.6 | stainless steel | 200 |
| 142 | R-124 | DMP | tris(nonyl-phenyl)phosphite | 10 | 3.8 | copper, stainless steel, aluminium | 220 |
| 143 | R-123 | DMP | dilauryl phosphite | 20 | 2.2 | stainless steel, aluminium | 200 |
| 144 | R-142b | DMF | trimethyl phosphite | 60 | 0.7 | copper, stainless steel | 180 |
| 145 | R-142b | DMA | tris(tridecyl) phosphite | 30 | 3.7 | aluminium | 200 |
| 146 | R-152a | DMP | diphenylnonyl-phenyl phosphite | 10 | 2.3 | copper, aluminium | 200 |

TABLE 11

| Sample No. | Flon | Glycol Ether | Phosphite Compound | Flon/ Glycol Ether (wt %) | Phosphite Glycol Ether (wt %) | Metals | Test Temp. (°C.) |
|---|---|---|---|---|---|---|---|
| 147 | R-21 | EGDBE | trimethyl phosphite | 25 | 0.4 | copper, stainless steel | 180 |
| 148 | R-21 | TEGDME | dilauryl phosphite | 55 | 2.1 | copper, stainless steel, aluminium | 220 |
| 149 | R-22 | DEGDBE | triphenyl phosphite | 5 | 1.5 | aluminium | 200 |
| 150 | R-22 | T3EGDME | phenyldiisooctyl phosphite | 45 | 1.3 | stainless steel | 160 |
| 151 | R-22 | TEGDME | trilauryl | 60 | 2.1 | copper, | 120 |

TABLE 11-continued

| Sample No. | Flon | Glycol Ether | Phosphite Compound | Flon/ Glycol Ether (wt %) | Phosphite Glycol Ether (wt %) | Metals | Test Temp. (°C.) |
|---|---|---|---|---|---|---|---|
| | | | phosphite | | | stainless steel | |
| 152 | R-23 | DEGDME | diisooctyl phosphite | 50 | 1.3 | copper, aluminium | 160 |
| 153 | R-123 | DEGDEE | trioleyl phosphite | 60 | 2.1 | copper, aluminium | 200 |
| 154 | R-124 | DEGDME | diphenyl(tri-decyl)phosphite | 30 | 1.4 | copper, stainless steel | 160 |
| 155 | R-124 | T3EGDME | diphenylnonyl-phenyl phosphite | 40 | 1.9 | stainless steel, aluminium | 180 |
| 156 | R-133 | T3EGDME | diethyl phosphite | 40 | 0.7 | copper, stainless steel, aluminium | 180 |
| 157 | R-124b | TEGDBE | tridecyl phosphite | 10 | 1.7 | stainless steel | 180 |
| 158 | R-142b | T3EGDME | dioleyl phosphite | 20 | 3.5 | copper | 220 |
| 159 | R-152a | TEGDME | trinonylphenyl phosphite | 50 | 3.8 | copper, aluminium | 220 |

As a result of the test, it was found that the samples 134 through 159 of the present invention were slower in rate of coloration or less susceptible to coloration than the comparative samples 160 through 185 and showed a satisfactory stabilizing effect.

At the same time, the quantitative analyses of Al, Fe and Cu were made, revealing that an increase of metal ions in composition coincided with the results of the quantitative analysis of free halogen and the qualitative and quantitative analyses of decomposition products by chromatograph.

As will be appreciated from the foregoing, the stabilized composition according to the invention exhibits the satisfactory stabilizing effect against high temperatures irrespective of the kind of metal and the mixing ratio of the fluorinated hydrocarbon and the amide or glycol ether compound.

What is claimed is:

1. An absorption refrigeration composition comprising a fluorinated hydrocarbon serving as a refrigerant, an amide as an absorbent, and a phosphite compound contained in an amount of 0.05 to 0.5 wt %, calculated as phosphorus, of said absorbent.

2. The composition according to claim 1, wherein said fluorinated hydrocarbon is a hydrocarbon which has at least one hydrogen, at least one fluorine and the balance of chlorine attached to the carbon atoms.

3. The composition according to claim 1 or 2, wherein said fluorinated hydrocarbon is a member selected from the group consisting of monochlorodifluoromethane, dichloromonofluoromethane, trifluoromethane, monochlorotetrafluoroethane, dichlorotrifluoroethane, monochlorotrifluoroethane, monochlorodifluoroethane, difluoroethane and mixtures thereof.

4. The composition according to claim 3, wherein said fluorinated hydrocarbon is monochlorodifluoromethane.

5. The composition according to claim 3, wherein said fluorinated hydrocarbon is monochlorotetrafluoroethane.

6. The composition according to claim 3, wherein said fluorinated hydrocarbon is a mixture of monochlorodifluoromethane and monochlorotetrafluoroethane.

7. The composition according to claim 1, wherein said amide compound is N, N-dimethylformamide, N, N-dimethylacetamide, N, N-dimethylpropionamide, N, N-diethylformamide or a mixture thereof.

8. The composition according to claim 7, wherein said amide compound is N, N-dimethylformamide.

9. The composition according to claim 7, wherein said amide compound is N, N-dimethylacetamide.

10. The composition according to claim 7, wherein said amide compound is a mixture of N, N-dimethylformamide and N, N-dimethylacetamide.

11. The composition according to claim 1, wherein said phosphite compound is represented by the general formula, $(R_3O)(R_4O)(R_5O)P$, in which $R_3$, $R_4$ and $R_5$ are independently hydrogen, alkyl, alkenyl, phenyl, alkylphenyl, alkylenephenyl or alkylenealkylphenyl provided that at least one of $R_3$, $R_4$ and $R_5$ has to be a group other than hydrogen.

12. The composition according to claim 1 or 11, wherein said phosphite compound is an alkyl phosphite which has at least two alkyl groups each having 1-18 carbon atoms.

13. The composition according to claim 12, wherein said at least two alkyl groups each has 3-13 carbon atoms.

14. The composition according to claim 1 or 11, wherein said phosphite compound is an alkylphenyl phosphite which has at least two alkyl phenyl groups whose alkyl moiety has 1-9 carbon atoms.

15. The composition according to claim 1 or 11, wherein said phosphite compound is an arylalkyl phosphite having at least one alkyl group, at least one phenyl or alkyl phenyl group.

16. The composition according to claim 1, wherein said phosphite compound is contained in an amount of 0.05 to 0.2 wt %, calculated as phosphorus, of said absorbent.

17. The composition comprising a fluorinated hydrocarbon selected from the group consisting of monochlorodifluoromethane, monochlorotetrafluoroethane and its isomer, and a mixture thereof, an amide compound selected from the group consisting of N, N-dimethylformamide, N, N-dimethylacetamide and a mixture thereof, and an alkyl phosphite which has at least two alkyl groups each having 3-13 carbon atoms, said alkyl phosphite being contained in an amount of 0.05 to 0.2 wt % of said amide compound calculated as phosphorus.

* * * * *